(12) United States Patent
Akiyama

(10) Patent No.: US 9,898,394 B2
(45) Date of Patent: Feb. 20, 2018

(54) TEST DESIGN ASSISTANCE DEVICE, TEST DESIGN ASSISTANCE METHOD, PROGRAM AND COMPUTER-READABLE MEDIUM

(71) Applicant: FUJI XEROX CO., LTD., Tokyo (JP)

(72) Inventor: Koichi Akiyama, Tokyo (JP)

(73) Assignee: FUJI XEROX CO., LTD., Tokyo (JP)

( * ) Notice: Subject to any disclaimer, the term of this patent is extended or adjusted under 35 U.S.C. 154(b) by 398 days.

(21) Appl. No.: 14/796,135

(22) Filed: Jul. 10, 2015

(65) Prior Publication Data

US 2015/0317242 A1 Nov. 5, 2015

Related U.S. Application Data

(63) Continuation of application No. PCT/JP2013/072113, filed on Aug. 19, 2013.

(30) Foreign Application Priority Data

Mar. 14, 2013 (JP) .................................. 2013-051948

(51) Int. Cl.
*G06F 11/36* (2006.01)
(52) U.S. Cl.
CPC .............................. *G06F 11/3684* (2013.01)
(58) Field of Classification Search
CPC .......................... G06F 11/3684; G06F 11/36
See application file for complete search history.

(56) References Cited

U.S. PATENT DOCUMENTS

2017/0153283 A1* 6/2017 Gontier ................ G01R 31/083

FOREIGN PATENT DOCUMENTS

| JP | 2002-259464 A | 9/2002 |
| JP | 2004-288034 A | 10/2004 |
| JP | 2006-252316 A | 9/2006 |
| JP | 2007-041784 A | 2/2007 |
| JP | 2010-113551 A | 5/2010 |

OTHER PUBLICATIONS

Koichi Akiyama; "Chokkohyo Ni Yoru Kumiawase Test Nyumon Moraritsu & Koritsusei No Takai Test Jisshi No Tebiki"; Software Test Press, Jan. 5, 2006; vol. 2; pp. 89-107.
ISR (PCT/ISA/210); dated Sep. 17, 2013, in related International Application No. PCT/JP2013/072113.
Written Opinion (PCT/ISA/237) dated Sep. 17, 2013, issued by the International Searching Authority in counterpart International Application No. PCT/JP2013/072113.

* cited by examiner

*Primary Examiner* — Kyoung Lee
(74) *Attorney, Agent, or Firm* — Sughrue Mion, PLLC

(57) ABSTRACT

A test design assistance device 10 acquires information about the number of levels indicating the number of values which can be obtained for each factor in a plurality of factors of a test target, selects a matrix capable of allocating all of factors in a maximum number of levels information in the matrix capable of allocating factors in multilevel generated based on an orthogonal table, sets the maximum number of the number of levels in the levels of factors which are not allocated as a focused number of levels, and allocates factors in the focused number of levels to the matrix when the number of columns capable of allocating the factors in the focused number of levels is equal to greater than the number of factors in the focused number of levels, in the selected matrix.

7 Claims, 12 Drawing Sheets

FIG. 2

|    | 1 | 2 | 3 | 4 | 5 | 6 | 7 | 8 | 9 | 10 | 11 | 12 | 13 | 14 | 15 |
|----|---|---|---|---|---|---|---|---|---|----|----|----|----|----|----|
| 1  | 0 | 0 | 0 | 0 | 0 | 0 | 0 | 0 | 0 | 0  | 0  | 0  | 0  | 0  | 0  |
| 2  | 0 | 0 | 0 | 0 | 0 | 0 | 0 | 1 | 1 | 1  | 1  | 1  | 1  | 1  | 1  |
| 3  | 0 | 0 | 0 | 1 | 1 | 1 | 1 | 0 | 0 | 0  | 0  | 1  | 1  | 1  | 1  |
| 4  | 0 | 0 | 0 | 1 | 1 | 1 | 1 | 1 | 1 | 1  | 1  | 0  | 0  | 0  | 0  |
| 5  | 0 | 1 | 1 | 0 | 0 | 1 | 1 | 0 | 0 | 1  | 1  | 0  | 0  | 1  | 1  |
| 6  | 0 | 1 | 1 | 0 | 0 | 1 | 1 | 1 | 1 | 0  | 0  | 1  | 1  | 0  | 0  |
| 7  | 0 | 1 | 1 | 1 | 1 | 0 | 0 | 0 | 0 | 1  | 1  | 1  | 1  | 0  | 0  |
| 8  | 0 | 1 | 1 | 1 | 1 | 0 | 0 | 1 | 1 | 0  | 0  | 0  | 0  | 1  | 1  |
| 9  | 1 | 0 | 1 | 0 | 1 | 0 | 1 | 0 | 1 | 0  | 1  | 0  | 1  | 0  | 1  |
| 10 | 1 | 0 | 1 | 0 | 1 | 0 | 1 | 1 | 0 | 1  | 0  | 1  | 0  | 1  | 0  |
| 11 | 1 | 0 | 1 | 1 | 0 | 1 | 0 | 0 | 1 | 0  | 1  | 1  | 0  | 1  | 0  |
| 12 | 1 | 0 | 1 | 1 | 0 | 1 | 0 | 1 | 0 | 1  | 0  | 0  | 1  | 0  | 1  |
| 13 | 1 | 1 | 0 | 0 | 1 | 1 | 0 | 0 | 1 | 1  | 0  | 0  | 1  | 1  | 0  |
| 14 | 1 | 1 | 0 | 0 | 1 | 1 | 0 | 1 | 0 | 0  | 1  | 1  | 0  | 0  | 1  |
| 15 | 1 | 1 | 0 | 1 | 0 | 0 | 1 | 0 | 1 | 1  | 0  | 1  | 0  | 0  | 1  |
| 16 | 1 | 1 | 0 | 1 | 0 | 0 | 1 | 1 | 0 | 0  | 1  | 0  | 1  | 1  | 0  |

FIG. 3

| | 1 | 2 | 3 | 1-2-3 | 4 | 8 | 12 | 4-8-12 | 5 | 10 | 15 | 5-10-15 | 6 | 11 | 13 | 6-11-13 | 7 | 9 | 14 | 7-9-14 |
|---|---|---|---|---|---|---|---|---|---|---|---|---|---|---|---|---|---|---|---|---|
| 1 | 0 | 0 | 0 | 000 | 0 | 0 | 0 | 000 | 0 | 0 | 0 | 000 | 0 | 0 | 0 | 000 | 0 | 0 | 0 | 000 |
| 2 | 0 | 0 | 0 | 000 | 0 | 1 | 1 | 011 | 0 | 1 | 1 | 011 | 0 | 1 | 1 | 011 | 0 | 1 | 1 | 011 |
| 3 | 0 | 0 | 0 | 000 | 1 | 0 | 1 | 101 | 1 | 0 | 1 | 101 | 1 | 0 | 1 | 101 | 1 | 0 | 1 | 101 |
| 4 | 0 | 0 | 0 | 000 | 1 | 1 | 0 | 110 | 1 | 1 | 0 | 110 | 1 | 1 | 0 | 110 | 1 | 1 | 0 | 110 |
| 5 | 0 | 1 | 1 | 011 | 0 | 0 | 0 | 000 | 0 | 1 | 1 | 011 | 1 | 1 | 0 | 110 | 1 | 0 | 1 | 101 |
| 6 | 0 | 1 | 1 | 011 | 0 | 1 | 1 | 011 | 0 | 0 | 0 | 000 | 1 | 0 | 1 | 101 | 1 | 1 | 0 | 110 |
| 7 | 0 | 1 | 1 | 011 | 1 | 0 | 1 | 101 | 1 | 1 | 0 | 110 | 0 | 1 | 1 | 011 | 0 | 0 | 0 | 000 |
| 8 | 0 | 1 | 1 | 011 | 1 | 1 | 0 | 110 | 1 | 0 | 1 | 101 | 0 | 0 | 0 | 000 | 0 | 1 | 1 | 011 |
| 9 | 1 | 0 | 1 | 101 | 0 | 0 | 0 | 000 | 1 | 0 | 1 | 101 | 0 | 1 | 1 | 011 | 1 | 1 | 0 | 110 |
| 10 | 1 | 0 | 1 | 101 | 0 | 1 | 1 | 011 | 1 | 1 | 0 | 110 | 0 | 0 | 0 | 000 | 1 | 0 | 1 | 101 |
| 11 | 1 | 0 | 1 | 101 | 1 | 0 | 1 | 101 | 0 | 0 | 0 | 000 | 1 | 1 | 0 | 110 | 0 | 1 | 1 | 011 |
| 12 | 1 | 0 | 1 | 101 | 1 | 1 | 0 | 110 | 0 | 1 | 1 | 011 | 1 | 0 | 1 | 101 | 0 | 0 | 0 | 000 |
| 13 | 1 | 1 | 0 | 110 | 0 | 0 | 0 | 000 | 1 | 1 | 0 | 110 | 1 | 0 | 1 | 101 | 0 | 1 | 1 | 011 |
| 14 | 1 | 1 | 0 | 110 | 0 | 1 | 1 | 011 | 1 | 0 | 1 | 101 | 1 | 1 | 0 | 110 | 0 | 0 | 0 | 000 |
| 15 | 1 | 1 | 0 | 110 | 1 | 0 | 1 | 101 | 0 | 1 | 1 | 011 | 0 | 0 | 0 | 000 | 1 | 1 | 0 | 110 |
| 16 | 1 | 1 | 0 | 110 | 1 | 1 | 0 | 110 | 0 | 0 | 0 | 000 | 0 | 1 | 1 | 011 | 1 | 0 | 1 | 101 |

FIG. 4

|  | NUMBER OF FACTORS IN TWO-LEVEL | NUMBER OF FACTORS IN FOUR-LEVEL |
|---|---|---|
| PATTERN 1 | 15 | 0 |
| PATTERN 2 | 12 | 1 |
| PATTERN 3 | 9 | 2 |
| PATTERN 4 | 6 | 3 |
| PATTERN 5 | 3 | 4 |
| PATTERN 6 | 0 | 5 |

FIG. 5

| No. | A | B | C | D | E | F | G | H | I | J | K | L | M | N | O | P | Q | R | S | T | U | V | W | X | Y |
|---|---|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 1 | 1 | 1 | 1 | 0 | 1 | 1 | 1 | 1 | 0 | 1 | 1 | 1 | 1 | 0 | 1 | 1 | 1 | 1 | 0 | 1 | 1 | 1 | 1 | 0 |
| 3 | 2 | 2 | 2 | 2 | 0 | 2 | 2 | 2 | 2 | 0 | 2 | 2 | 2 | 2 | 0 | 2 | 2 | 2 | 2 | 0 | 2 | 2 | 2 | 2 | 0 |
| 4 | 3 | 3 | 3 | 3 | 0 | 3 | 3 | 3 | 3 | 0 | 3 | 3 | 3 | 3 | 0 | 3 | 3 | 3 | 3 | 0 | 3 | 3 | 3 | 3 | 0 |
| 5 | 2 | 0 | 1 | 3 | 1 | 2 | 0 | 1 | 3 | 1 | 2 | 0 | 1 | 3 | 1 | 2 | 0 | 1 | 3 | 1 | 2 | 0 | 1 | 3 | 1 |
| 6 | 3 | 1 | 0 | 2 | 1 | 3 | 1 | 0 | 2 | 1 | 3 | 1 | 0 | 2 | 1 | 3 | 1 | 0 | 2 | 1 | 3 | 1 | 0 | 2 | 1 |
| 7 | 0 | 2 | 3 | 1 | 1 | 0 | 2 | 3 | 1 | 1 | 0 | 2 | 3 | 1 | 1 | 0 | 2 | 3 |  | 1 | 0 | 2 | 3 | 1 | 1 |
| 8 | 1 | 3 | 2 | 0 | 1 | 1 | 3 | 2 | 0 | 1 | 1 | 3 | 2 | 0 | 1 | 1 | 3 | 2 | 0 | 1 | 1 | 3 | 2 | 0 | 1 |
| 9 | 3 | 0 | 2 | 1 | 2 | 3 | 0 | 2 | 1 | 2 | 3 | 0 | 2 | 1 | 2 | 3 | 0 | 2 | 1 | 2 | 3 | 0 | 2 | 1 | 2 |
| 10 | 2 | 1 | 3 | 0 | 2 | 2 | 1 | 3 | 0 | 2 | 2 | 1 | 3 | 0 | 2 | 2 | 1 | 3 | 0 | 2 | 2 | 1 | 3 | 0 | 2 |
| 11 | 1 | 2 | 0 | 3 | 2 | 1 | 2 | 0 | 3 | 2 | 1 | 2 | 0 | 3 | 2 | 1 | 2 | 0 | 3 | 2 | 1 | 2 | 0 | 3 | 2 |
| 12 | 0 | 3 | 1 | 2 | 2 | 0 | 3 | 1 | 2 | 2 | 0 | 3 | 1 | 2 | 2 | 0 | 3 | 1 | 2 | 2 | 0 | 3 | 1 | 2 | 2 |
| 13 | 1 | 0 | 3 | 2 | 3 | 1 | 0 | 3 | 2 | 3 | 1 | 0 | 3 | 2 | 3 | 1 | 0 | 3 | 2 | 3 | 1 | 0 | 3 | 2 | 3 |
| 14 | 0 | 1 | 2 | 3 | 3 | 0 | 1 | 2 | 3 | 3 | 0 | 1 | 2 | 3 | 3 | 0 | 1 | 2 | 3 | 3 | 0 | 1 | 2 | 3 | 3 |
| 15 | 3 | 2 | 1 | 0 | 3 | 3 | 2 | 1 | 0 | 3 | 3 | 2 | 1 | 0 | 3 | 3 | 2 | 1 | 0 | 3 | 3 | 2 | 1 | 0 | 3 |
| 16 | 2 | 3 | 0 | 1 | 3 | 2 | 3 | 0 | 1 | 3 | 2 | 3 | 0 | 1 | 3 | 2 | 3 | 0 | 1 | 3 | 2 | 3 | 0 | 1 | 3 |
| 17 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 1 | 1 | 1 | 1 | 0 | 1 | 1 | 1 | 0 | 1 | 1 | 1 | 0 | 1 | 1 | 1 | 0 | 1 | 1 | 1 | 0 | 1 | 1 | 1 | 1 |
| 19 | 2 | 2 | 2 | 2 | 0 | 2 | 2 | 2 | 0 | 2 | 2 | 2 | 0 | 2 | 2 | 2 | 0 | 2 | 2 | 2 | 0 | 2 | 2 | 2 | 2 |
| 20 | 3 | 3 | 3 | 3 | 0 | 3 | 3 | 3 | 0 | 3 | 3 | 3 | 0 | 3 | 3 | 3 | 0 | 3 | 3 | 3 | 0 | 3 | 3 | 3 | 3 |
| 21 | 2 | 0 | 1 | 3 | 1 | 0 | 1 | 3 | 1 | 2 | 1 | 3 | 1 | 2 | 0 | 3 | 1 | 2 | 0 | 1 | 1 | 2 | 0 | 1 | 3 |
| 22 | 3 | 1 | 0 | 2 | 1 | 1 | 0 | 2 | 1 | 3 | 0 | 2 | 1 | 3 | 1 | 2 | 1 | 3 | 1 | 0 | 1 | 3 | 1 | 0 | 2 |
| 23 | 0 | 2 | 3 | 1 | 1 | 2 | 3 | 1 | 1 | 0 | 3 | 1 | 1 | 0 | 2 | 1 | 1 | 0 | 2 | 3 | 1 | 0 | 2 | 3 | 1 |
| 24 | 1 | 3 | 2 | 0 | 1 | 3 | 2 | 0 | 1 | 1 | 2 | 0 | 1 | 1 | 3 | 0 | 1 | 1 | 3 | 2 | 1 | 1 | 3 | 2 | 0 |
| 25 | 3 | 0 | 2 | 1 | 2 | 0 | 2 | 1 | 2 | 3 | 2 | 1 | 2 | 3 | 0 | 1 | 2 | 3 | 0 | 2 | 2 | 3 | 0 | 2 | 1 |
| 26 | 2 | 1 | 3 | 0 | 2 | 1 | 3 | 0 | 2 | 2 | 3 | 0 | 2 | 2 | 1 | 0 | 2 | 2 | 1 | 3 | 2 | 2 | 1 | 3 | 0 |
| 27 | 1 | 2 | 0 | 3 | 2 | 2 | 0 | 3 | 2 | 1 | 0 | 3 | 2 | 1 | 2 | 3 | 2 | 1 | 2 | 0 | 2 | 1 | 2 | 0 | 3 |
| 28 | 0 | 3 | 1 | 2 | 2 | 3 | 1 | 2 | 2 | 0 | 1 | 2 | 2 | 0 | 3 | 2 | 2 | 0 | 3 | 1 | 2 | 0 | 3 | 1 | 2 |
| 29 | 1 | 0 | 3 | 2 | 3 | 0 | 3 | 2 | 3 | 1 | 3 | 2 | 3 | 1 | 0 | 2 | 3 | 1 | 0 | 3 | 3 | 1 | 0 | 3 | 2 |
| 30 | 0 | 1 | 2 | 3 | 3 | 1 | 2 | 3 | 3 | 0 | 2 | 3 | 3 | 0 | 1 | 3 | 3 | 0 | 1 | 2 | 3 | 0 | 1 | 2 | 3 |
| 31 | 3 | 2 | 1 | 0 | 3 | 2 | 1 | 0 | 3 | 3 | 1 | 0 | 3 | 3 | 2 | 0 | 3 | 3 | 2 | 1 | 3 | 3 | 2 | 1 | 0 |
| 32 | 2 | 3 | 0 | 1 | 3 | 3 | 0 | 1 | 3 | 2 | 0 | 1 | 3 | 2 | 3 | 1 | 3 | 2 | 3 | 0 | 3 | 2 | 3 | 0 | 1 |

FIG. 6

| No. | A | B | C | D | E | F | G | H | I | J | K | L | M | N | O | P | Q | R | S | T | U | V | W | X | a | b | c | d | e | f | g | h | i |
|---|---|---|---|---|---|---|---|---|---|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 1 | 1 | 1 | 1 | 0 | 1 | 1 | 1 | 1 | 0 | 1 | 1 | 1 | 1 | 0 | 1 | 1 | 1 | 1 | 0 | 1 | 1 | 1 | 1 | 0 | 0 | 0 | 0 | 0 | 0 | 0 | 0 | 0 |
| 3 | 2 | 2 | 2 | 2 | 0 | 2 | 2 | 2 | 2 | 0 | 2 | 2 | 2 | 2 | 0 | 2 | 2 | 2 | 2 | 0 | 2 | 2 | 2 | 2 | 0 | 0 | 0 | 0 | 0 | 0 | 0 | 0 | 0 |
| 4 | 3 | 3 | 3 | 3 | 0 | 3 | 3 | 3 | 3 | 0 | 3 | 3 | 3 | 3 | 0 | 3 | 3 | 3 | 3 | 0 | 3 | 3 | 3 | 3 | 0 | 0 | 0 | 0 | 0 | 0 | 0 | 0 | 0 |
| 5 | 2 | 0 | 1 | 3 | 1 | 2 | 0 | 1 | 3 | 1 | 2 | 0 | 1 | 3 | 1 | 2 | 0 | 1 | 3 | 1 | 2 | 0 | 1 | 3 | 0 | 1 | 1 | 0 | 1 | 1 | 0 | 1 | 1 |
| 6 | 3 | 1 | 0 | 2 | 1 | 3 | 1 | 0 | 2 | 1 | 3 | 1 | 0 | 2 | 1 | 3 | 1 | 0 | 2 | 1 | 3 | 1 | 0 | 2 | 0 | 1 | 1 | 0 | 1 | 1 | 0 | 1 | 1 |
| 7 | 0 | 2 | 3 | 1 | 1 | 0 | 2 | 3 | 1 | 1 | 0 | 2 | 3 | 1 | 1 | 0 | 2 | 3 | 1 | 1 | 0 | 2 | 3 | 1 | 0 | 1 | 1 | 0 | 1 | 1 | 0 | 1 | 1 |
| 8 | 1 | 3 | 2 | 0 | 1 | 1 | 3 | 2 | 0 | 1 | 1 | 3 | 2 | 0 | 1 | 1 | 3 | 2 | 0 | 1 | 1 | 3 | 2 | 0 | 0 | 1 | 1 | 0 | 1 | 1 | 0 | 1 | 1 |
| 9 | 3 | 0 | 2 | 1 | 2 | 3 | 0 | 2 | 1 | 2 | 3 | 0 | 2 | 1 | 2 | 3 | 0 | 2 | 1 | 2 | 3 | 0 | 2 | 1 | 1 | 0 | 1 | 1 | 0 | 1 | 1 | 0 | 1 |
| 10 | 2 | 1 | 3 | 0 | 2 | 2 | 1 | 3 | 0 | 2 | 2 | 1 | 3 | 0 | 2 | 2 | 1 | 3 | 0 | 2 | 2 | 1 | 3 | 0 | 1 | 0 | 1 | 1 | 0 | 1 | 1 | 0 | 1 |
| 11 | 1 | 2 | 0 | 3 | 2 | 1 | 2 | 0 | 3 | 2 | 1 | 2 | 0 | 3 | 2 | 1 | 2 | 0 | 3 | 2 | 1 | 2 | 0 | 3 | 1 | 0 | 1 | 1 | 0 | 1 | 1 | 0 | 1 |
| 12 | 0 | 3 | 1 | 2 | 2 | 0 | 3 | 1 | 2 | 2 | 0 | 3 | 1 | 2 | 2 | 0 | 3 | 1 | 2 | 2 | 0 | 3 | 1 | 2 | 1 | 0 | 1 | 1 | 0 | 1 | 1 | 0 | 1 |
| 13 | 1 | 0 | 3 | 2 | 3 | 1 | 0 | 3 | 2 | 3 | 1 | 0 | 3 | 2 | 3 | 1 | 0 | 3 | 2 | 3 | 1 | 0 | 3 | 2 | 1 | 1 | 0 | 1 | 1 | 0 | 1 | 1 | 0 |
| 14 | 0 | 1 | 2 | 3 | 3 | 0 | 1 | 2 | 3 | 3 | 0 | 1 | 2 | 3 | 3 | 0 | 1 | 2 | 3 | 3 | 0 | 1 | 2 | 3 | 1 | 1 | 0 | 1 | 1 | 0 | 1 | 1 | 0 |
| 15 | 3 | 2 | 1 | 0 | 3 | 3 | 2 | 1 | 0 | 3 | 3 | 2 | 1 | 0 | 3 | 3 | 2 | 1 | 0 | 3 | 3 | 2 | 1 | 0 | 1 | 1 | 0 | 1 | 1 | 0 | 1 | 1 | 0 |
| 16 | 2 | 3 | 0 | 1 | 3 | 2 | 3 | 0 | 1 | 3 | 2 | 3 | 0 | 1 | 3 | 2 | 3 | 0 | 1 | 3 | 2 | 3 | 0 | 1 | 1 | 1 | 0 | 1 | 1 | 0 | 1 | 1 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 1 | 1 | 1 | 1 | 0 | 1 | 1 | 1 | 1 | 0 | 1 | 1 | 1 | 1 | 0 | 1 | 1 | 1 | 1 | 0 | 1 | 1 | 1 | 1 | 0 | 1 | 1 | 1 | 1 | 0 | 1 | 0 | 1 |
| 19 | 2 | 2 | 2 | 2 | 0 | 2 | 2 | 2 | 2 | 0 | 2 | 2 | 2 | 2 | 0 | 2 | 2 | 2 | 2 | 0 | 2 | 2 | 2 | 2 | 1 | 0 | 1 | 0 | 1 | 1 | 1 | 1 | 0 |
| 20 | 3 | 3 | 3 | 3 | 0 | 3 | 3 | 3 | 3 | 0 | 3 | 3 | 3 | 3 | 0 | 3 | 3 | 3 | 3 | 0 | 3 | 3 | 3 | 3 | 1 | 1 | 0 | 1 | 0 | 1 | 0 | 1 | 1 |
| 21 | 2 | 0 | 1 | 3 | 1 | 0 | 1 | 3 | 1 | 2 | 1 | 3 | 1 | 2 | 0 | 3 | 1 | 2 | 0 | 1 | 1 | 2 | 0 | 1 | 1 | 1 | 0 | 1 | 0 | 1 | 0 | 1 | 1 |
| 22 | 3 | 1 | 0 | 2 | 1 | 1 | 0 | 2 | 1 | 3 | 0 | 2 | 1 | 3 | 1 | 2 | 1 | 3 | 1 | 0 | 1 | 3 | 1 | 0 | 1 | 0 | 1 | 0 | 1 | 1 | 1 | 1 | 0 |
| 23 | 0 | 2 | 3 | 1 | 1 | 2 | 3 | 1 | 1 | 0 | 3 | 1 | 1 | 0 | 2 | 1 | 1 | 0 | 2 | 3 | 1 | 0 | 2 | 3 | 0 | 1 | 1 | 1 | 1 | 0 | 1 | 0 | 1 |
| 24 | 1 | 3 | 2 | 0 | 1 | 3 | 2 | 0 | 1 | 1 | 2 | 0 | 1 | 1 | 3 | 0 | 1 | 1 | 3 | 2 | 1 | 1 | 3 | 2 | 0 | 0 | 0 | 0 | 0 | 0 | 0 | 0 | 0 |
| 25 | 3 | 0 | 2 | 1 | 2 | 0 | 2 | 1 | 2 | 3 | 2 | 1 | 2 | 3 | 0 | 1 | 2 | 3 | 0 | 2 | 2 | 3 | 0 | 2 | 0 | 1 | 1 | 1 | 1 | 0 | 1 | 0 | 1 |
| 26 | 2 | 1 | 3 | 0 | 2 | 1 | 3 | 0 | 2 | 2 | 3 | 0 | 2 | 2 | 1 | 0 | 2 | 2 | 1 | 3 | 2 | 2 | 1 | 3 | 0 | 0 | 0 | 0 | 0 | 0 | 0 | 0 | 0 |
| 27 | 1 | 2 | 0 | 3 | 2 | 2 | 0 | 3 | 2 | 1 | 0 | 3 | 2 | 1 | 2 | 3 | 2 | 1 | 2 | 0 | 2 | 1 | 2 | 0 | 1 | 1 | 0 | 1 | 0 | 1 | 0 | 1 | 1 |
| 28 | 0 | 3 | 1 | 2 | 2 | 3 | 1 | 2 | 2 | 0 | 1 | 2 | 2 | 0 | 3 | 2 | 2 | 0 | 3 | 1 | 2 | 0 | 3 | 1 | 1 | 0 | 1 | 0 | 1 | 1 | 1 | 1 | 0 |
| 29 | 1 | 0 | 3 | 2 | 3 | 0 | 3 | 2 | 3 | 1 | 3 | 2 | 3 | 1 | 0 | 2 | 3 | 1 | 0 | 3 | 3 | 1 | 0 | 3 | 1 | 0 | 1 | 0 | 1 | 1 | 1 | 1 | 0 |
| 30 | 0 | 1 | 2 | 3 | 3 | 1 | 2 | 3 | 3 | 0 | 2 | 3 | 3 | 0 | 1 | 3 | 3 | 0 | 1 | 2 | 3 | 0 | 1 | 2 | 1 | 1 | 0 | 1 | 0 | 1 | 0 | 1 | 1 |
| 31 | 3 | 2 | 1 | 0 | 3 | 2 | 1 | 0 | 3 | 3 | 1 | 0 | 3 | 3 | 2 | 0 | 3 | 3 | 2 | 1 | 3 | 3 | 2 | 1 | 0 | 0 | 0 | 0 | 0 | 0 | 0 | 0 | 0 |
| 32 | 2 | 3 | 0 | 1 | 3 | 3 | 0 | 1 | 3 | 2 | 0 | 1 | 3 | 2 | 3 | 1 | 3 | 2 | 3 | 0 | 3 | 2 | 3 | 0 | 0 | 1 | 1 | 1 | 1 | 0 | 1 | 0 | 1 |

DEVIDE Y: columns a–i

FIG. 7

| CONFIGURATION OF TEST MATRIX | NUMBER OF TEST CASE | NUMBER OF FACTORS WHICH CAN BE ALLOCATED FOR EACH SIZE | | | | | |
|---|---|---|---|---|---|---|---|
| | | TWO-LEVEL | FOUR-LEVEL | EIGHT-LEVEL | SIXTEEN-LEVEL | THIRTYTWO-LEVEL | SIXTYFOUR-LEVEL |
| $L_4$ × TWO-COLUMN | 8 TIMES | 9 | | | | | |
| $L_8$ × TWO-COLUMN | 16 TIMES | 49 | | | | | |
| $L_8$ × TWO-COLUMN | 16 TIMES | 16 | 1 | | | | |
| $L_{16}$ × TWO-COLUMN | 32 TIMES | 225 | | | | | |
| $L_{16}$ × TWO-COLUMN | 32 TIMES | 64 | | 1 | | | |
| $L_{16}$ × TWO-COLUMN | 32 TIMES | | 25 | | | | |
| $L_{32}$ × TWO-COLUMN | 64 TIMES | 961 | | | | | |
| $L_{32}$ × TWO-COLUMN | 64 TIMES | 256 | | | 1 | | |
| $L_{32}$ × TWO-COLUMN | 64 TIMES | | 64 | 1 | | | |
| $L_{64}$ × TWO-COLUMN | 128 TIMES | 3969 | | | | | |
| $L_{64}$ × TWO-COLUMN | 128 TIMES | 1024 | | | | 1 | |
| $L_{64}$ × TWO-COLUMN | 128 TIMES | | 441 | | | | |
| $L_{64}$ × TWO-COLUMN | 128 TIMES | 16 | 225 | 4 | | | |
| $L_{64}$ × TWO-COLUMN | 128 TIMES | | 49 | 36 | | | |
| $L_{64}$ × TWO-COLUMN | 128 TIMES | | | 81 | | | |
| $L_{128}$ × TWO-COLUMN | 256 TIMES | 16129 | | | | | |
| $L_{128}$ × TWO-COLUMN | 256 TIMES | 4096 | | | | | 1 |
| $L_{128}$ × TWO-COLUMN | 256 TIMES | 2304 | 256 | | | 1 | |
| $L_{128}$ × TWO-COLUMN | 256 TIMES | 144 | 100 | 100 | 1 | | |
| $L_{256}$ × TWO-COLUMN | 512 TIMES | 65025 | | | | | |
| $L_{256}$ × TWO-COLUMN | 512 TIMES | | 4096 | | | | 1 |
| $L_{256}$ × TWO-COLUMN | 512 TIMES | 121 | 441 | 169 | 36 | | |
| $L_{256}$ × TWO-COLUMN | 512 TIMES | | | | 289 | | |

FIG. 10

| NUMBER OF FACTORS | HAYST METHOD | | ITERATIVE SLIDE METHOD | | PAIR-WISE | |
|---|---|---|---|---|---|---|
| 3 | 4.0 | 4 CASES | 5.5 | 4 CASES | 3.2 | 4 CASES |
| 7 | 8.0 | 8 CASES | 7.3 | 8 CASES | 5.6 | 7 CASES |
| 15 | 16.0 | 16 CASES | 9.7 | 16 CASES | 7.8 | 10 CASES |
| 31 | 32.0 | 32 CASES | 13.1 | 16 CASES | 9.9 | 12 CASES |
| 63 | 64.0 | 64 CASES | 17.9 | 32 CASES | 12.0 | 14 CASES |
| 127 | 128.0 | 128 CASES | 24.5 | 32 CASES | 14.0 | 16 CASES |
| 255 | 256.0 | 256 CASES | 33.9 | 64 CASES | 16.0 | 18 CASES |
| 511 | 512.0 | 512 CASES | 47.2 | 64 CASES | 18.0 | 20 CASES |
| 1023 | 1024.0 | 1024 CASES | 66.0 | 128 CASES | 20.0 | 23 CASES |

FIG. 11

| NUMBER OF FACTORS | HAYST METHOD | | ITERATIVE SLIDE METHOD | | PAIR-WISE | |
|---|---|---|---|---|---|---|
| 3 | 22.0 | 64 CASES | 26.2 | 64 CASES | 50.7 | 72 CASES |
| 7 | 50.0 | 64 CASES | 39.0 | 64 CASES | 89.8 | 97 CASES |
| 15 | 106.0 | 128 CASES | 56.2 | 128 CASES | 125.0 | 127 CASES |
| 31 | 218.0 | 256 CASES | 79.9 | 128 CASES | 158.5 | 161 CASES |
| 63 | 442.0 | 512 CASES | 113.1 | 128 CASES | 191.3 | 195 CASES |
| 127 | 890.0 | FAILURE | 159.8 | 256 CASES | 223.6 | 230 CASES |
| 255 | 1786.0 | FAILURE | 225.6 | 256 CASES | 255.8 | 264 CASES |
| 511 | 3578.0 | FAILURE | 318.5 | 512 CASES | 287.9 | 298 CASES |

FIG. 12

| SIZE OF FACTOR | NUMBER OF FACTORS | NUMBER OF TEST CASES BY ITERATIVE SLIDE METHOD | NUMBER OF TEST CASES BY HAYST METHOD |
|---|---|---|---|
| 4 | 53 | 44.8 | 45.4 |
| 8 | 377 | 273.8 | 273.9 |
| 16 | 2251 | 1425.3 | 1425.5 |

FIG. 14

| | SIZE AND NUMBER OF FACTORS TO BE COMBINED | ITERATIVE SLIDE METHOD: STRENGTH 2 | PAIR-WISE(PICT):COMPARISON WITH THE SAME NUMBER OF TEST CASES |
|---|---|---|---|
| 1 | $3^4$ | 15 (55.6%) | 13 (47.2%), 15(56.5%) |
| 2 | $3^{13}$ | 29 (67.9%) | 20 (60.1%), 29(99.2%) |
| 3 | $4^{15}3^{17}2^{29}$ | 60 (90.5%) | 36 (80.1%), 60(93.5%) |
| 4 | $4^1 3^{39} 2^{35}$ | 60 (93.7%) | 29 (84.0%), 60(98.3%) |
| 5 | $2^{100}$ | 31 (98.7%) | 16 (91.4%), 31(99.7%) |
| 6 | $4^7 8^6$ | 64 (31.9%) | 89 (37.5%), 64(29.9%) |
| 7 | $2^{12}4^{16}8^{10}16^1$ | 128 (58.5%) | 163 (60.7%), 128(56.3%) |
| 8 | $2^{11}4^{21}8^{13}16^6$ | 256 (55.7%) | 338 (59.5%), 256(54.4%) |
| 9 | $4^{64}8^1$ | 60 (62.6%) | 61 (62.1%), 60(61.5%) |
| 10 | $4^{49}8^{36}$ | 127 (48.7%) | 169 (56.2%), 127(48.5%) |
| 11 | $2^{144}4^{100}8^{100}16^1$ | 255 (—) | 249 (—) |
| 12 | $2^{121}4^{441}8^{169}16^{36}$ | 511 (—) | 622 (—) |

FIG. 15

| SIZE OF FACTORS | RATIO |
|---|---|
| 1~2 | 52% |
| 3~4 | 24% |
| 5~8 | 12% |
| 9~16 | 10% |
| 17 OR MORE | 2% |

FIG. 16

| SIZE OF FACTORS | NUMBER OF FACTORS | NUMBER OF TEST CASES BY ITERATIVE SLIDE METHOD | NUMBER OF TEST CASES BY HAYST METHOD |
|---|---|---|---|
| 4 | 25 | 31 | 40 |
| 4 | 81 | 63 | 54 |
| 8 | 289 | 255 | 270 |
| 16 | 289 | 511 | 1050 |

FIG. 17

| | SIZE OF FACTORS | ITERATIVE SLIDE METHOD | ESTIMATION EQUATION | DIFFERENCE |
|---|---|---|---|---|
| 1 | $3^4$ | 15 | 10.0 | 5.0 |
| 2 | $3^{13}$ | 29 | 16.4 | 12.6 |
| 3 | $4^{15}3^{17}2^{29}$ | 60 | 52.5 | 7.5 |
| 4 | $4^1 3^{39} 2^{35}$ | 60 | 44.8 | 15.2 |
| 5 | $2^{100}$ | 31 | 22.0 | 9.0 |
| 6 | $4^7 8^6$ | 64 | 52.2 | 11.8 |
| 7 | $2^{12}4^{10}8^{10}16^1$ | 128 | 102.2 | 25.8 |
| 8 | $2^{11}4^{21}8^{13}16^6$ | 256 | 160.1 | 95.9 |
| 9 | $4^{64}8^1$ | 60 | 64.0 | -4.0 |
| 10 | $4^{49}8^{36}$ | 127 | 128.0 | -1.0 |
| 11 | $2^{144}4^{100}8^{100}16^1$ | 255 | 256.0 | -1.0 |
| 12 | $2^{121}4^{441}8^{169}16^{36}$ | 511 | 512.0 | -1.0 |

FIG. 18

| | SIZE OF FACTORS TO BE COMBINED | RESULT BY ITERATIVE SLIDE METHOD | CALCULATION RESULT BY ESTIMATION EQUATION | ESTIMATION EQUATION (POWER OF 2) | DIFFERENCE |
|---|---|---|---|---|---|
| 1 | $3^4$ | 15 | 10.0 | 16 | -1 |
| 2 | $3^{13}$ | 29 | 16.4 | 32 | -3 |
| 3 | $4^{15}3^{17}2^{29}$ | 60 | 52.5 | 64 | -4 |
| 4 | $4^1 3^{39} 2^{35}$ | 60 | 44.8 | 64 | -4 |
| 5 | $2^{100}$ | 31 | 22.0 | 32 | -1 |
| 6 | $4^7 8^6$ | 64 | 52.2 | 64 | 0 |
| 7 | $2^{12}4^{10}8^{10}16^1$ | 128 | 102.2 | 128 | 0 |
| 8 | $2^{11}4^{21}8^{13}16^6$ | 256 | 160.1 | 256 | 0 |
| 9 | $4^{64}8^1$ | 60 | 64.0 | 64 | -4 |
| 10 | $4^{49}8^{36}$ | 127 | 128.0 | 128 | -1 |
| 11 | $2^{144}4^{100}8^{100}16^1$ | 255 | 256.0 | 256 | -1 |
| 12 | $2^{121}4^{441}8^{169}16^{36}$ | 512 | 512.0 | 512 | 0 |

US 9,898,394 B2

TEST DESIGN ASSISTANCE DEVICE, TEST DESIGN ASSISTANCE METHOD, PROGRAM AND COMPUTER-READABLE MEDIUM

CROSS REFERENCE TO RELATED APPLICATION

This is a continuation of International Application No. PCT/JP2013/072113 filed on Aug. 19, 2013, and claims priority from Japanese Patent Application No. 2013-051948, filed on Mar. 14, 2013.

BACKGROUND

1. Technical Field

The present invention is related to a test design assistance device, a test design assistance method, a program, and a computer-readable medium.

2. Related Art

A test may be performed in order to confirm whether or not an abnormal action occurs due to a combination of settings between a plurality of factors in software or the like.

In a case where the combination of settings between the plurality of factors is tested by using an orthogonal table, (n+1) tests are required to be performed with respect to the number of factors n when the number of levels which included in all of the factors is two, and thus a test case is linearly increased with respect to an increase in the number of factors. For this reason, a method has been proposed in which orthogonal tables which have only the same level of factors are laterally connected to each other only by the number of columns thereof, then the laterally connected orthogonal tables are vertically formed into two stages, and the number of factors $n^2$ can be performed with the test case of $2n-1$ and the orthogonal table at the lower stage by using a test matrix which is generated by cyclically shifting the order of columns one by one for each orthogonal table.

SUMMARY

An aspect of the present invention provides a test design assistance device including: an acquiring unit that acquires information about the number of levels indicating the number of values which can be obtained for each factor in a plurality of factors of a test target; a selection unit that selects a matrix capable of allocating all of factors in a maximum number of levels at least in the acquired information in the matrix capable of allocating the factors in multilevel generated based on an orthogonal table; a setting unit that sets the maximum number of levels in the number of levels of factors which are not allocated with respect to the selected matrix as a focused number of levels; an allocation unit that allocates factors in the focused number of levels to the matrix when the number of columns capable of allocating the factors in the focused number of levels is equal to or greater than the number of factors in the focused number of levels, in the selected matrix; an updating unit that updates the matrix by dividing a remaining column into columns capable of allocating the factors in the focused number of levels when there is the remaining column which is capable of allocating factors in the number of levels greater than the focused number of levels in the matrix, in a case where the number of columns capable of allocating the factors in the focused number of levels is not equal to or greater than the number of factors in the focused number of levels, in the selected matrix; and an execution unit that causes by the setting unit to execute processing after processing by the allocation unit or the updating unit and causes the setting unit, the allocation unit, and the updating unit to recursively execute the processing.

BRIEF DESCRIPTION OF THE DRAWINGS

Exemplary embodiment(s) of the present invention will be described in detail based on the following figures, wherein

FIG. 2 is a diagram illustrating an $L_{16}$ orthogonal table;

FIG. 3 is a diagram illustrating an extension $L_{16}$ orthogonal table which is extended so as to make the $L_{16}$ orthogonal table correspond to factors in four-level;

FIG. 4 is a diagram illustrating combinations of the number of levels and factors which can be allocated to the extension $L_{16}$ orthogonal table;

FIG. 5 is a diagram illustrating a basic test matrix to which 25 factors in four-levels can be allocated;

FIG. 6 is a diagram dividing one column of the basic test matrix shown in FIG. 5 into columns to which the factors in two-levels can be allocated;

FIG. 7 is a diagram illustrating an example of a basic test matrix table;

FIG. 10 is a table for comparing evaluations of a HAYST method, an iterative slide method, and a pair-wise method;

FIG. 11 is a table for comparing evaluations of the HAYST method, the iterative slide method, and the pair-wise method;

FIG. 12 is a diagram illustrating the number of factors having fewer test cases in the iterative slide method as compared with having fewer test cases in the pair-wise test;

FIG. 14 is a diagram illustrating the number of test cases regarding sizes of the factors and patterns of the numbers in twelve ways, each of which is created by using a tool of the iterative slide method and a tool of PICT;

FIG. 15 is a diagram illustrating the ratio of the sizes of the factors when combination tests are performed on twenty types of combined products;

FIG. 16 is a diagram illustrating a result of allocation performed by using the tool of the iterative slide method and the tool of the PICT;

FIG. 17 is a diagram obtained by comparing an allocation result with an estimation result in the iterative slide method; and FIG. 18 is a diagram obtained by comparing an allocation result and an estimation result in the iterative slide method.

DETAILED DESCRIPTION

Hereinafter, an exemplary embodiment of the present invention will be described with reference to (hereinafter, referred to as the embodiment) the drawings.

[1. Description of Function Provided by Test Design Assistance Device 10]

Figure 1:
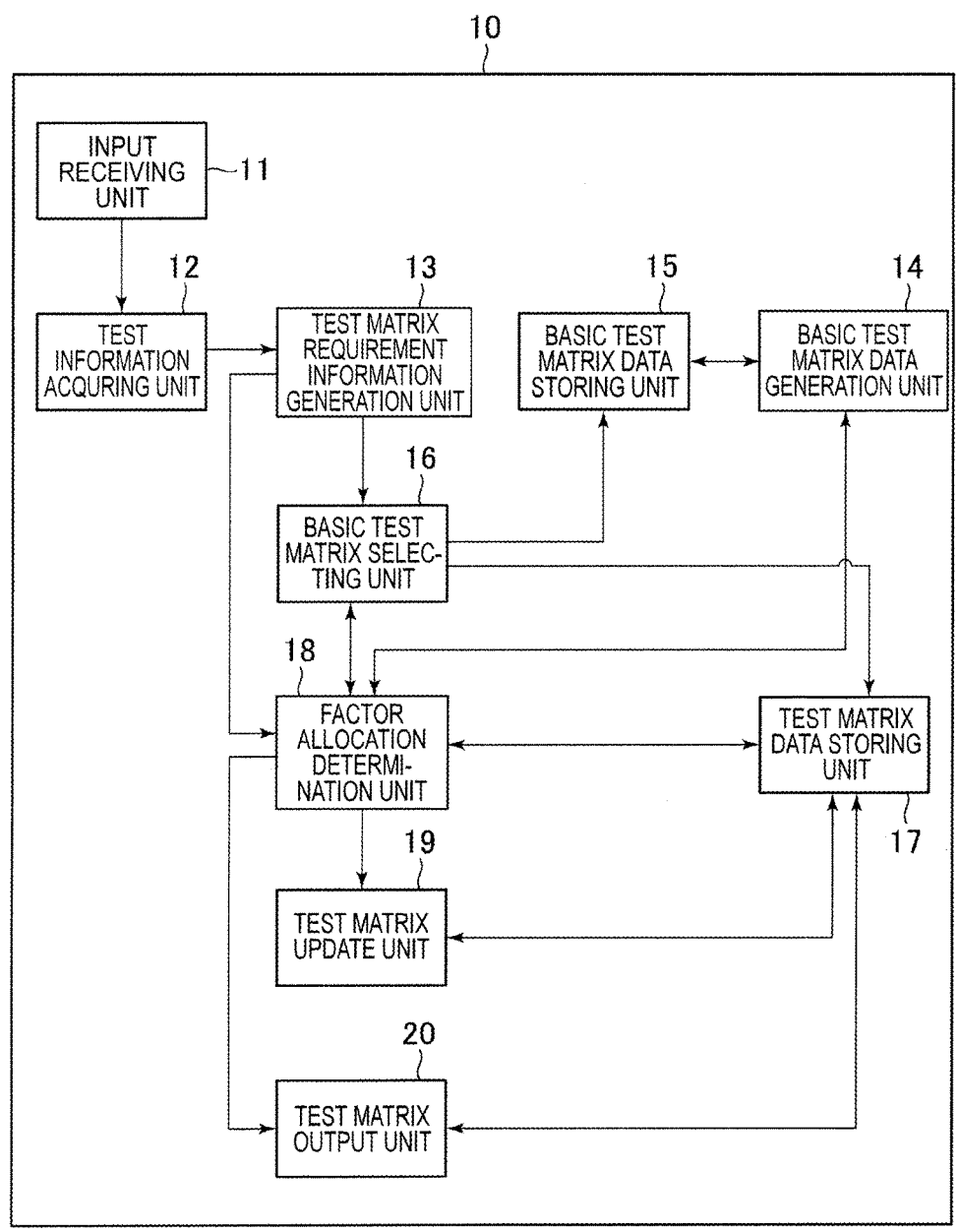
FIG. 1 is a functional block diagram of a test design assistance device relating to the present embodiment.

FIG. 1 is a functional block diagram of a test design assistance device 10 relating to the present embodiment. As shown in FIG. 1, the test design assistance device 10 includes an input receiving unit 11, a test information acquiring unit 12, a test matrix requirement information generation unit 13, a basic test matrix data generation unit 14, a basic test matrix data storing unit 15, a basic test matrix selecting unit 16, a test matrix data holding unit 17, a factor allocation determination unit 18, a test matrix update unit 19, and a test matrix output unit 20. Meanwhile, the test design assistance device 10 according to the embodiment generates a test matrix in which a set of levels of the respective factors of a test target is shown in each row when performing a test for software. That is, one row of the test matrix corresponds to one test case.

Functions of the above described units included in the test design assistance device 10 may be realized by causing a computer, which includes a control member such as a CPU, a storage member such as a memory, and an input and output member for transmitting and receiving data to and from an external device, to execute reading of a program stored in a computer-readable information storage medium. Meanwhile, the program may be supplied to the test design assistance device 10 corresponding to the computer by an information storage medium such as an optical disc, a magnetic disk, a magnetic tape, a magneto-optical disc, and a flash memory, or may be supplied to the test design assistance device 10 via a data communication network such as the Internet.

The input receiving unit 11 receives data which is input by using an input device or an external device such as a keyboard or a mouse.

The test information acquiring unit 12 may acquire factors of the test target in software of the test target (a variable indicating an input, environment conditions, and states in software of the test target) and information (test target information) of levels of the factors (a value that the factor can acquire) based on data received by the input receiving unit 11. Here, the test target information represents the total number of factors as n, a k-th factor as $T_k$, the number of levels included in the k-th factor as $S_k$ ($1 \leq k \leq n$), and a value of l-th level included in the k-th factor as $S_k^l$ ($1 \leq l \leq S_1$).

The test matrix requirement information generation unit 13 generates requirement information about the test matrix required for allocation of the factors of the test target based on the test target information obtained by the test information acquiring unit 12. In detail, the test matrix requirement information generation unit 13 adds the number of levels to the factors in which the number of levels is not a power of 2 among the factors included in the test target information such that the number of levels thereof is set to the power of 2. That is, if the number of levels $S_k$ included in the k-th factor satisfies the relation of $2^{(i-1)} < S_k < 2^i$, a dummy level is added to the factor $T_k$ until the number of levels $S_k$ is set to $2^i$. Here, the dummy level may be any of the levels of the factor $T_k$, but, for example, a level which is desired to be tested more may be selected as the dummy level.

The basic test matrix data generation unit 14 generates data relating to the basic test matrix which becomes a base for generating the test matrix. Here, a process example in a case where the basic test matrix is generated from the orthogonal table will be described with specific examples.

FIG. 2 shows an $L_{16}$ orthogonal table. Meanwhile, the orthogonal table refers to a matrix A in a case where all of $\lambda$ ordered pairs $S \times S = \{(0, 0), (0, 1), \ldots, (0, (s-1)), (1, 0), (1, 1), \ldots, ((s-1), (s-1))\}$ are exactly shown with respect to any two columns of A when the matrix A having $\lambda \times s^2$ rows and m columns with respect to a set $S = \{0, 1, 2, \ldots, s-1\}$ of positive integers is considered. In addition, an $L_{16}$ orthogonal table is an orthogonal table having 16 rows and 15 columns.

As shown in FIG. 2, the value of components in the $L_{16}$ orthogonal table is 0 or 1, thus the components correspond to only the factors in two-levels, and therefore, the $L_{16}$ orthogonal table is extended so that the components correspond to the factors in three or more levels.

FIG. 3 shows an extension $L_{16}$ orthogonal table which is extended so as to correspond to a factor in four-levels. The extension $L_{16}$ orthogonal table shown in FIG. 3 is the modified $L_{16}$ orthogonal table shown in FIG. 2 obtained by combining interactive columns with each other by using a creating method of multilevel columns of an experimental design method. In the $L_{16}$ orthogonal table shown in FIG. 3, for example, 1, 2, and 3 columns may be used as the factors in two-levels (0, 1) and the orthogonality is maintained even when a 1-2-3 column is used as factors in four-levels (000, 011, 101, 110) by combining the factors in two-levels. However, a combination of any one of 1, 2, and 3 columns and the 1-2-3 column only appears as half, and thus it is not possible to use both columns at the same time. For this reason, combinations of the number of levels and factors which can be allocated to the extension $L_{16}$ orthogonal table are as shown in FIG. 4.

Here, an extension method (a slide method) of the orthogonal table for increasing the number of factors which can be tested on the orthogonal table of the same number of levels will be described. The slide method is a method of laterally connecting orthogonal tables which only have the factors each having the same number of levels by the number of columns thereof and forming the table into two stages. Here, the orthogonal table at the second stage is configured to slide columns of the second table and the subsequent tables one by one to the left side so that the content of the row at the upper stage does not overlap with the content of the row at the lower stage. Here, when an orthogonal table $L_m$ formed of m rows and n columns, which only has the factors each having the same number of levels is provided, an algorithm for creating a test matrix $M_{2m}$ formed of 2m rows and $n^2$ columns using the slide method is as follows.

First, as step 1, a matrix at the upper stage is generated by laterally extending the orthogonal tables by applying the following Equation (1).

[Equation 1]

$$M'_m = L_m \oplus L_m \oplus \ldots \oplus L_m \quad (1)$$

Here, an operator in the Equation (1) (+ in a circle) is assumed to be an operator adding columns, and $M'_m$ is assumed to be obtained by laterally connecting n orthogonal tables $L_m$. This means that the initial orthogonal tables $L_m$ are laterally aligned by the number of columns.

Next, as step 2, a matrix at the lower stage is generated by applying the following Equation (2).

[Equation 2]

$$M''_m = L_m^1 \oplus L_m^2 \oplus \ldots \oplus L_m^n \quad (2)$$

Here, $L_m^i$ is assumed to be a table in the next equation when $l_i$ is assumed to be the i-th column in the orthogonal table $L_m$.

[Equation 3]

$$L_m^i = l_i \oplus l_{(i+1)} \oplus \ldots \oplus l_n \oplus l_1 \oplus l_2 \oplus \ldots \oplus l_{(i-1)} \quad (3)$$

That is, $L_m^i$ is the orthogonal table which starts from the i-th column and ends at column (i−1) in the orthogonal table $L_m$.

Lastly, as step 3, the test matrix $M_{2m}$ is generated by overlapping the matrix at the upper stage and the matrix at the lower stage by applying the following Equation (4).

[Equation 4]

$$M_{2m} = M'_m \boxplus M''_m \qquad (4)$$

Here, an operator in the Equation (4) (+ in a square) is assumed to be an operator adding rows.

Here, the basic test matrix data generation unit 14 generates the basic test matrix by applying the above-described slide method with respect to the matrix in which the orthogonal table in two-levels is extended to be the orthogonal table in two-levels or more.

For example, when the $L_{16}$ orthogonal table is used to allocate all of the factors therein in two-levels, 225 columns and 32 rows of the basic test matrix are obtained, and when the $L_{16}$ orthogonal table is used to allocate all of the factors therein in four-levels, 25 columns and 32 rows of the basic test matrix are obtained (refer to FIG. 5). In this manner, a basic test matrix generation unit generates the basic test matrix which is capable of allocating the factors in the one or higher level member based on the optional size of orthogonal table $L_m$.

Meanwhile, regarding the basic test matrix capable of allocating 25 factors in four-levels as shown in FIG. 5, as shown in FIG. 6, one or more columns thereof can be divided into columns capable of allocating the factors in two-levels. In the columns shown in FIG. 6, a Y column shown in FIG. 5 is divided into eight columns capable of allocating the factors in two-levels. In this way, the test matrix is generated, which is capable of allocating 24 factors in four-levels and eight factors in two-levels.

The basic test matrix data storing unit 15 stores data relating to the basic test matrix which is generated by the basic test matrix data generation unit 14.

FIG. 7 is a diagram illustrating an example of a basic test matrix table stored in the basic test matrix data storing unit 15. Items of information on a configuration of the test matrix, on the number of executable test cases, and on the number of allocatable factors for each size of the factors (the number of levels) are stored in the basic test matrix table as shown in FIG. 7 while being correlated to each other. Here, in a case where the test matrix is configured to have $L_m \times 2$ stages, it means that the number of levels or the number of factors capable of corresponding to the orthogonal table $L_m$ is generated by extending the orthogonal table $L_m$ by the slide method.

The basic test matrix selecting unit 16 selects the basic test matrix from the basic test matrix table stored in the basic test matrix data storing unit 15, based on the test matrix requirement information (data obtained by making the number of levels of each factor be a power of 2) generated by the test matrix requirement information generation unit 13. For example, the basic test matrix selecting unit 16 may select the basic test matrix, which is capable of allocating all factors having the maximum number of levels in the test matrix requirement information, from the basic test matrix table.

The test matrix data holding unit 17 holds the basic test matrix which is selected by the basic test matrix selecting unit 16 as initial data of the test matrix. Meanwhile, the test matrix held in the test matrix data holding unit 17 is updated by the test matrix update unit 19 based on the determination result obtained by the factor allocation determination unit 18.

The factor allocation determination unit 18 determines whether or not the allocation of the factors can be performed in order from the factors having the high level included in the test matrix requirement information with respect to the test matrix held in the test matrix data holding unit 17. In a case where all of the factors in the number of levels of the target can be allocated to the current (in the initial state when the update has been not performed, or after the update when the update has been performed) test matrix, the factor allocation determination unit 18 allocates the factors with respect to the current test matrix, and in a case where the allocation cannot be performed, when a column which is capable of allocating the factors having a higher number of levels than the target remains, the factor allocation determination unit 18 instructs the test matrix update unit 19 to divide the column into columns which are capable of allocating the factors in the number of levels of the target. In addition, the factor allocation determination unit 18 predetermines whether or not the allocation of the factors can be performed with respect to the updated test matrix. Further, In a case where the factors in the number of levels of the target cannot be allocated to the current test matrix, when a column which is capable of allocating the factors having a higher number of levels than the target does not remain, the factor allocation determination unit 18 may determine that the allocation cannot be performed and may instruct the basic test matrix selecting unit 16 to reselect the basic test matrix. In addition, when all of the factors in the minimum number of levels included in the test matrix requirement information can be allocated to the test matrix stored in the test matrix data holding unit 17, the factor allocation determination unit 18 determines the allocation can be performed and instructs the test matrix output unit 20 to output data.

The test matrix update unit 19 updates the test matrix stored in the test matrix data holding unit 17 based on the determination result from the factor allocation determination unit 18. Specifically, in a case where the factors in the number of levels of the target cannot be allocated to the current test matrix by the factor allocation determination unit 18, when it is determined that a column which is capable of allocating the factors having a higher number of levels than the target remains, the test matrix update unit 19 divides the column which is capable of allocating the factors having a higher number of levels into columns which are capable of allocating the factors in the number of levels of the target and then updates the test matrix stored in the test matrix data holding unit 17.

The test matrix output unit 20 outputs the test matrix held in the test matrix data holding unit 17 when the factor allocation determination unit 18 determines that the allocation can be performed. For example, the output of the test matrix includes a display of the test matrix on a display device, data transmission of the test matrix, and printing out of the test matrix, or the like.

[2. Description of Process Performed by Test Design Assistance Device 10]

Next, processes performed by the test design assistance device 10 will be described in detail with reference to flow charts shown in FIG. 8 and FIG. 9.

Figure 8:
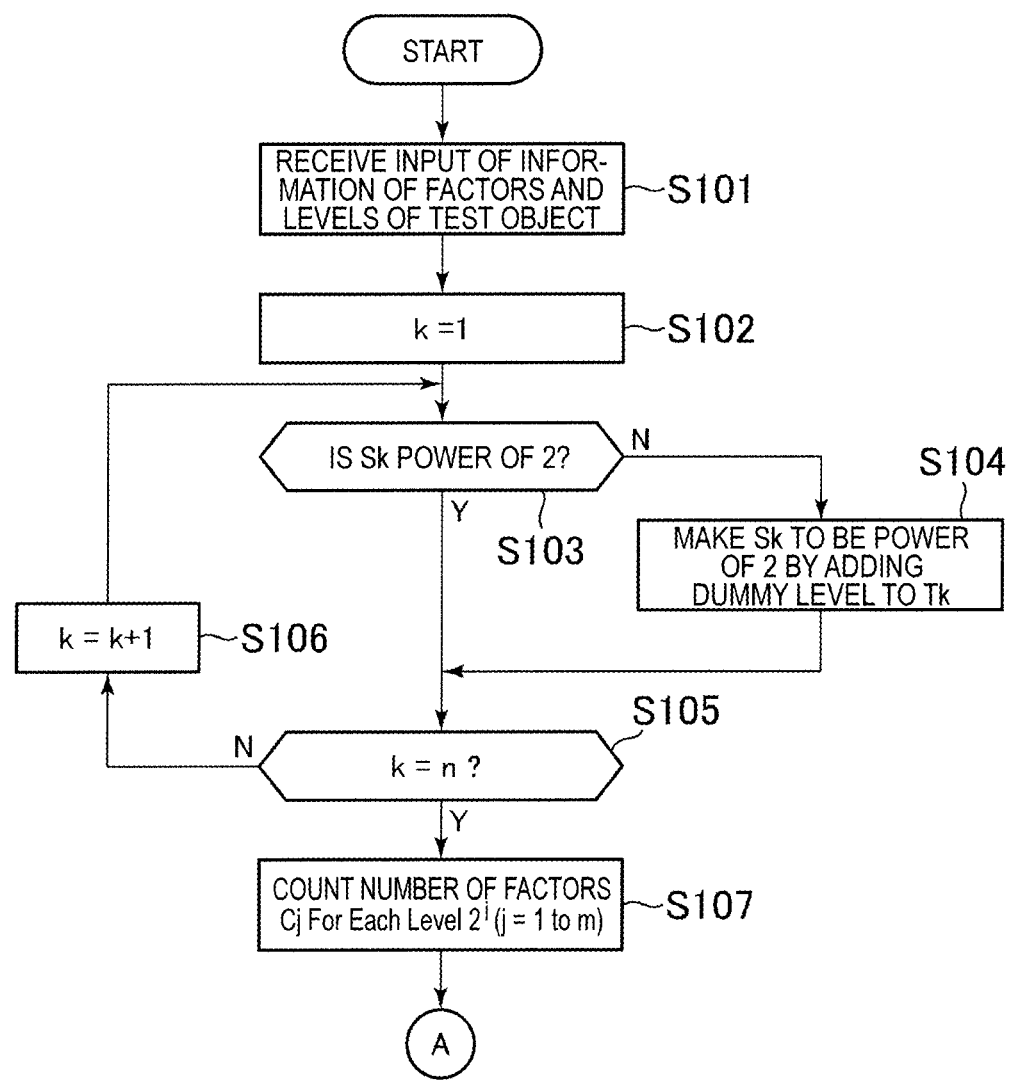
FIG. 8 is a flow chart of a process which is performed by a test design assistance device.

As shown in FIG. 8, the test design assistance device 10 receives the input of information (the test target information) regarding, for example, the factors and levels of the test object from the user (S101). As described above, the test target information represents the total number of factors as n, a k-th factor as $T_k$, the number of levels included in the k-th factor as $S_k$ ($1 \leq k \leq n$), and a value of l-th level included in the k-th factor as $S_k^l$ ($1 \leq l \leq S_l$).

Next, the test design assistance device 10 sets a variable k to 1 (S102) and corrects $S_k$ to a power of 2 by adding a dummy level to the factor $T_k$ (S104) when the number of levels $S_k$ of the factor $T_k$ is not a power of 2 (S103: Y).

In a case where the number of levels $S_k$ of the factor $T_k$ is the power of 2 (S103: Y), or, in a case where the variable k does not reach the total number n of the factors (S105: N) after S104, the test design assistance device 10 returns to S103 by incrementing k (adding 1 to k) (S106). In addition, in a case where the variable k reaches the total number n of the factor (S105: Y), the test design assistance device 10 counts the number of factors $C_j$ for each level $2^j$ (j=1 to m) (S107). The process S107 and the subsequent processes will be described with reference to a flowchart in FIG. 9.

Figure 9:
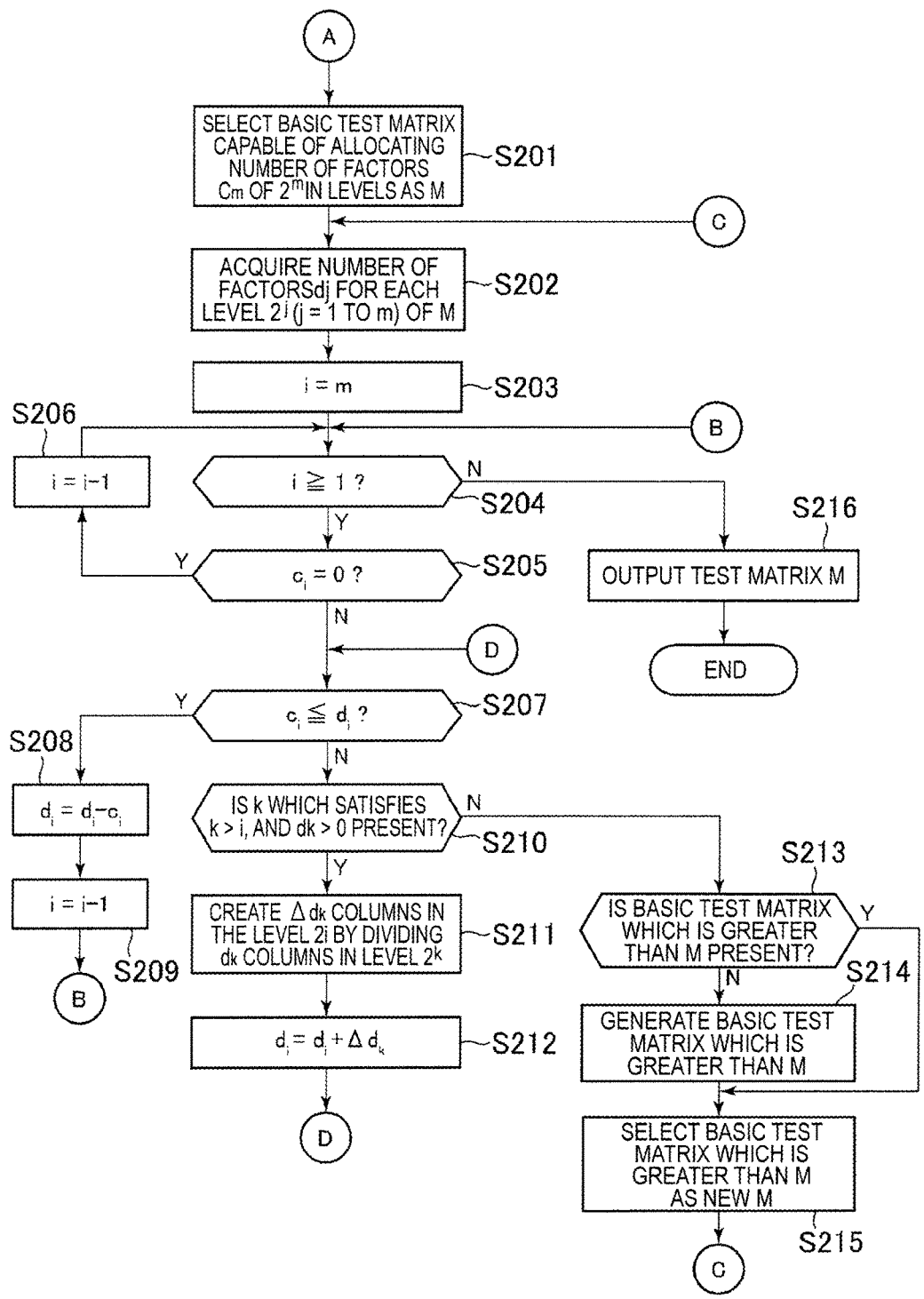
FIG. 9 is a flow chart of a process which is performed by a test design assistance device.

As shown in FIG. 9, the test design assistance device 10 selects the basic test matrix capable of allocating the number of factors $C_m$ of $2^m$ which is the maximum number of levels with reference to the basic test matrix table after S107 (S201). For example, the test design assistance device 10 may select the basic test matrix in which the number of factors which can be allocated to the number of levels $2^m$ is equal to or greater than $C_m$ from the basic test matrix table. Then, the test design assistance device 10 sets the selected basic test matrix to the initial data of the test matrix M.

Next, the test design assistance device 10 acquires the number of factors $d_j$ which can be allocated for each level $2^j$ (j=1 to m) of the test matrix M (S202). Then, the test design assistance device 10 performs the following process by setting the variable i to be m (S203).

First, in the test design assistance device 10, when the variable i is equal to or greater than 1 (S204: Y), the process proceeds to S205. Here, in the test design assistance device 10, when the number of factors $C_i$ of the level $2^i$ relating to the test target information is 0 (S205: Y), the process proceeds to S204 by decrementing the variable i (subtracting 1 from i) (S206). In addition, in the test design assistance device 10, when the number of factors $C_i$ of the level $2^i$ relating to the test target information is not 0 (S205: N), the process proceeds to the following process.

In the test design assistance device 10, when the number of factors $C_i$ of the level $2^i$ relating to the test target information is equal to or less than the number of factors $d_i$ which can be allocated for the level $2^i$ in the test matrix M (S207: Y), the process proceeds to S204 by decrementing the variable i (subtracting 1 from i) (S209) while updating $d_i$ by subtracting $C_i$ from the current $d_i$ (S208).

In addition, in the test design assistance device 10, when the number of factors $C_i$ of the level $2^i$ relating to the test target information is not equal to or less than the number of factors $d_i$ which can be allocated for the level $2^i$ in the test matrix M (S207: N), the process proceeds to the following process.

Here, when k which satisfies expressions k>i, and $d_k$>0 is present in the test matrix M (S210: Y), the test design assistance device 10 creates $\Delta d_k$ columns in the level $2^i$ by dividing $d_k$ columns in the level $2^k$ in the test matrix M (S211). In addition, in the test design assistance device 10, the process returns to S207 by adding $\Delta d_k$ to the number of factors $d_i$ which can be allocated for level $2^i$ in the test matrix (S212).

Further, when k which satisfies expressions k>i, and $d_k$>0 is not present in the test matrix M (S210: N), the test design assistance device 10 determines whether or not the basic test matrix which is greater than the test matrix M is present in the basic test matrix table (S213).

The test design assistance device 10 generates the basic test matrix which is greater than the test matrix M (S214) when it is determined that the basic test matrix which is greater than the test matrix M is not present in S213 (S213: N). The generation of the basic test matrix may be performed by the basic test matrix data generation unit 14.

In the test design assistance device 10, when it is determined that the basic test matrix which is greater than the test matrix M is present in S213 (S213: Y), or after S214, the process returns to S202 by selecting the basic test matrix which is greater than the test matrix M as a new test matrix M.

Meanwhile, in the test design assistance device 10, when the variable i is not equal to or greater than 1 in S204, that is, the variable i is set to 0 (S204: N), the process is completed by outputting the test matrix M as the completion of the allocation for all of the factors relating to the test target information finishes (S216).

In the above-described flowchart, when the test design assistance device 10 determines that the basic test matrix which is greater than the test matrix M is not present in S213 (S213: N), the process may return to S202 by causing the number of factors and the number of levels to be lower instead of generating the basic test matrix which is greater than the test matrix M (S214), or may finish with a result of not capable of allocating the factors.

[3. Description of Number of Test Cases]

Next, regarding the test matrix (Table) which is created by the method according to the present invention (hereinafter, referred to as an iterative slide method), an estimation of the number of test cases (rows) will be formulated. First, a table created by the iterative slide method is assumed to be a table of the number of factors $n_1$, $n_2$, by the slide method. Here, sizes of the factors represent $S_1, S_2, \ldots$, and sizes of the tables by the slide method represent $N_1, N_2, \ldots$. The sizes of the tables are as in the following Equation (5) (here, indicated by $N_2$).

[Equation 5]

$$N_1 = 2\sqrt{n_1}(S_1-1)+2$$

$$N_2 = 2\sqrt{n_2}(S_2-1)+2 \qquad (5)$$

Accordingly, the size N of the table which is created by the iterative slide method is indicated in Equation (6).

[Equation 6]

$$N = 2\left(\sum_{i=1}^{i}\sqrt{n_i}(S_i-1)+1\right) \qquad (6)$$

[4. Evaluation and Effect of Method According to the Present Embodiment]

Next, the following methods are compared and evaluated: an iterative slide method and a method according to the orthogonal table (hereinafter, referred to as a HAYST method), and a PICT.

[4-1. Method of Evaluation]

In order to compare the iterative slide method and the pair-wise test, "the factor, the level, the number of test cases, a coverage ratio, and the strength" are selected as main causes relating to the evaluation of a combination test case. The reason for selecting these main causes is as follows. First, the scale of the test target is determined by the factor and the level. In the combination test, since the plural factors having different sizes are combined, the factor and the level of the test target is assumed to be indicated by raising the number of the factors to the number of levels included in the factor. For example, when each number of factors of the test target in four-levels, three-levels, and two-levels is 15, 17, and 39, it is expressed by $4^{15}3^{17}2^{39}$. This indicates the combined number of a round robin of all of the levels. The number of test cases corresponds to the number of the rows of the applied orthogonal table in the HAYST method, and corresponds to the number of generated rows in the pair-wise test. The coverage ratio is a ratio with respect to the number of combinations of all of the levels appearing when k arbitrary factors are extracted from all of the factors of the test target, and is referred to as a coverage ratio between k factors. The strength is a value of k when the test matrix is in a state where the coverage ratio between k factors is 100%. For example, when coverage the ratio between two factors is 100%, the table is referred to as a "table of strength 2". The orthogonal table is guaranteed with the strength 2. In addition, the pair-wise test is a technique of adding the test cases until the strength is set to 2. Both the orthogonal table and the pair-wise test can create the test matrix having the strength 3 (this is referred to as a k-way test).

Regarding the following three points, the evaluation of the HAYST method and the pair-wise test is performed by using the above-described main causes of the evaluation: (A) an evaluation of the number of test cases by a formulated approximate equation, (B) an evaluation of an actual measurement value of the number of test cases and the coverage ratio of the three factors, and (C) an evaluation of the number of appearances of combinations of the test matrixes.

[4-1-1. Evaluation of the Number of Test Cases by Formulated Approximate Equation]

As shown in Equation (6), the number of test cases of the iterative slide method increases at the rate of the number of factors to the half power. The number of test cases by the HAYST method is indicated in the following Equation (7). In addition, when using a greedy algorithm which is employed by a tool of PICT by the pair-wise test, the number of test cases is approximated in the following Equation (8).

[Equation 7]

$$P = \sum_{k=1}^{r} (S_k - 1) + 1 \quad (7)$$

[Equation 8]

$$N \sim \frac{l^2}{2} \log_2 k \quad (8)$$

Here, l represents the size of the factor.

FIG. 10 shows an approximate calculation result when the size of the factor is 2 in the above approximate equations (6), (7), and (8). Since the factors are intensively indicated by the HAYST method (the orthogonal table), the value which is obtained by subtracting 1 from the power of 2 is employed as the number of factors. Therefore, for example, a portion having a value of 16.0 by the HAYST method corresponds to using the $L_{16}$ orthogonal table.

As shown in FIG. 10, in a case where the size of all of the factors is 2, in the iterative slide method as compared with the HAYST method, for example, the number of factors is 255, that is, the number of factors is reduced to 1/7 of that in the test case.

FIG. 11 shows a calculation result and an actual measurement value when the size of the factors is set as 8 in the same calculation. The cases of "failure" occur because an eight-level linear graph is not created in the orthogonal table $L_{1024}$, $L_{2048S}$, and $L_{4096}$. The cases should logically be 1024 cases, 2048 cases, and 4096 cases.

When 81 factors of which the size of is 8 are allocated, that is, a case where all the columns of the iterative slide method are used, 128 test cases by the iterative slide method and 204 test cases by the tool of PICT are acquired. According to the approximate equation, when the number of factors is lower, the number of test cases acquired by the iterative slide method is lower, but when the number of factors is more than 378, the number of test cases acquired by the pair-wise test becomes lower.

FIG. 12 shows that the number of factors having fewer test cases in the iterative slide method as compared with having fewer test cases in the pair-wise method. FIG. 12 shows that the number of test cases acquired by the iterative slide method is lower than the number of test cases acquired by the pair-wise method until the number of factors in four-levels is 53 in the approximate equation. The number of factors in eight-levels is 377 and the number of factors in sixteen-levels is 2251. The actual number of measurement values of the number of factors was 289 in sixteen-levels, 512 by the iterative slide method, and 1050 by the tool of PICT.

Figure 13:
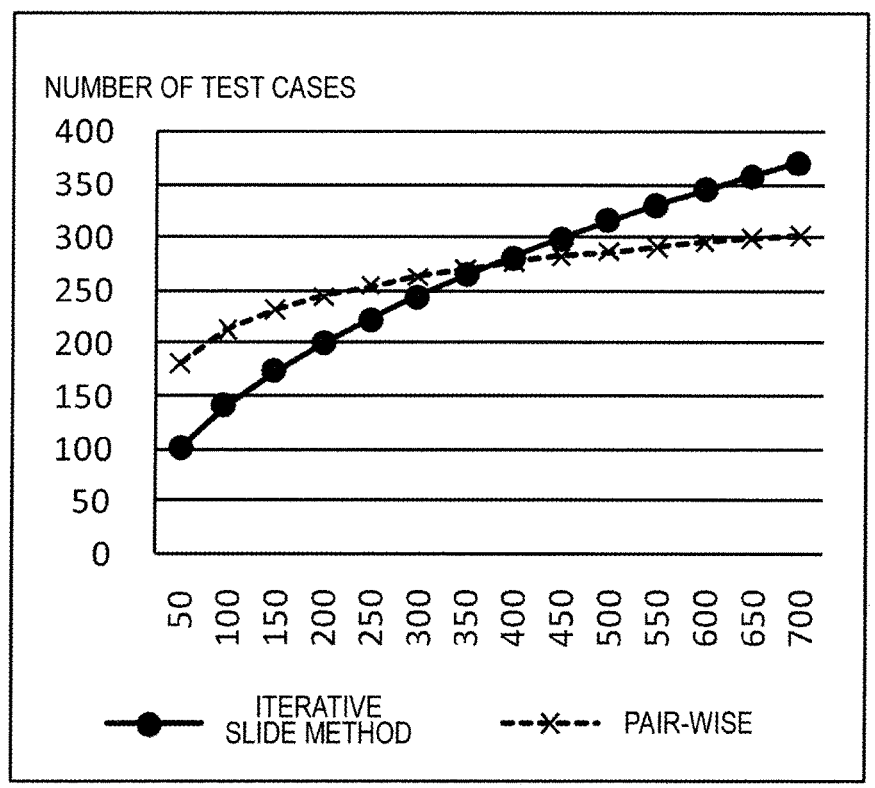
FIG. 13 is a graph obtained by comparing the number of factors and the number of test cases in the iterative slide method with the pair-wise test.

FIG. 13 is a graph obtained by comparing the number of factors with the number of test cases in the iterative slide method and the pair-wise method when the size of the factor is fixed to 8. It is understood that graphs are cross linked at the point where the number of factors is more than 377. Meanwhile, the number of the factors in two-levels acquired by the pair-wise method is always lower than that by the iterative slide method. In addition, similarly, in a case where the number of the factors in three-levels acquired by the pair-wise method is lower than that by the iterative slide method since the dummy level is added to make the factor in four-levels by the iterative slide method and thus the waste is generated. In this manner, regarding the factor in equal to or greater than four-levels, as the number of levels of the factor is great, the number of test cases acquired by the iterative slide method is lower than the number of test cases acquired by the pair-wise test.

As described above, the comparison and evaluation is performed focusing on the number of test cases by using the approximate equation. Generally, the number of test cases acquired by the orthogonal table is more than the number of test cases acquired by the pair-wise test, but the orthogonal table has an excellent balance of the combination appearance and thus has a higher multifactorial coverage ratio compared with the pair-wise test.

[4-1-2. Evaluation Regarding Actual Measurement Value of the Number of Test Cases and Coverage Ratio Between Three Factors]

Next, the number of test cases, in which the factors are actually allocated, acquired by the iterative slide method is compared with that by the pair-wise method by using twelve types of samples and the coverage ratio between three factors is compared in two methods. FIG. 14 shows the comparison result.

FIG. 14 shows the number of test cases regarding sizes of the factors and patterns of the numbers in twelve ways each of which are created by using a tool of the iterative slide method and a tool of PICT. Meanwhile, since the coverage ratio between two factors in both methods is 100%, the coverage ratio between three factors is shown in parentheses. A first item in the column of the pair-wise method represents a result generated at a 100% coverage ratio between two factors which is a generation mode of default and a second item represents a value obtained by adding the number of generation test cases to the number of generation test cases acquired by the iterative slide method by comparing the coverage ratio between three factors with the result of the iterative slide method. Cases 1 to 5 in which the number of test cases generated by the pair-wise test is lower are generated by the pair-wise test at the strength 3 and then combined with the number of test cases acquired by the iterative slide method, and others are generated at the strength 2, and then reduced so as to match the number of test cases. The factors from Cases 1 to 5 are in two-levels to four-levels. In contrast, the number of test cases realizing a 100% coverage ratio between two factors by the pair-wise method is about half compared with the iterative slide method. In addition, in a case where the same number of test cases as that in the iterative slide method is increased by the pair-wise method, the coverage ratio between three factors is set to a higher value than that in the iterative slide method. From the above description, it is preferable to use the pair-wise method in these cases. The factors from Cases 6 to 8 are in eight-levels and sixteen-levels. In contrast, the number of test cases realizing a 100% coverage ratio between two factors by the iterative slide method is less than that in the pair-wise method. When the number of the test cases generated by the pair-wise method is reduced to the same number of those by the iterative slide method, the iterative slide method has the higher coverage ratio of the three factors. For this reason, it is preferable to use the iterative slide method. Cases 9 to 12 show patterns in which the factors and levels are allocated by the iterative slide method without gaps therebetween. In such a pattern, the number of test cases is the same, or the iterative slide method has a smaller number of test cases than the pair-wise method. Meanwhile, a portion of (–) in the table is the portion in which the coverage ratio between three factors cannot be calculated due to a large number of factors. In the present embodiment, the factor in equal to or greater than five-levels is referred to as a "large factor" and the factor in equal to or less than four-levels is referred to as a "small factor". The size of the factors is determined in the sorting process from a distribution of the factor sizes in the testing of actual products.

FIG. 15 shows a ratio of the sizes of the factors when combination tests are performed on twenty types of combined products. From FIG. 15, it is understood that the small factors in four-levels account for 76% of the entirety, but the large factors in five-levels account for 24% and thus cannot be ignored.

As described above, the fact that the pair-wise method is advantageous in the test having only the small factors (Cases 1 to 5 in FIG. 14), and the iterative slide method is advantageous when it comes to the large factors (Cases 6 to 12 in FIG. 14), can be confirmed by not only the above-described approximate equation but also the actual measurement value. In addition, generally the orthogonal table is excellent in the coverage ratio between three factors. However, when matching the number of test cases, differences are within 5% except for case 3 and thus it is considered that the difference in the number of test cases is contributed to the determination of the coverage ratio between three factors.

Here, there is a large difference of 31.3% in Case 2 of FIG. 14 in comparison to the coverage ratio between three factors, but it can be considered that the factor in three-levels is assumed to be the factor in four-levels in the iterative slide method. The reason is that if the factor is generated in $4^{13}$ but not in $3^{13}$, the values are close to each other, that is, the value is 31 (42.3%) in the iterative slide method, and the values are 33 (45.1%) and 31 (43.1%) in the pair-wise method.

[4-1-3. Evaluation Regarding the Number of Appearances of Combination of Test Matrixes]

The iterative slide method is performed based on the orthogonal table, and thus the same combinations as those in the orthogonal table in the first half or the second half of the test cases appear the same number of times. Accordingly, an analysis of the total dispersion and interaction between different columns on the orthogonal table which is laterally increased by the iterative slide method may be performed by the result in the first half of the test cases and an analysis of the total dispersion and interaction between the same columns may be performed by the result in the second half of the test cases. For example, a case where $L_8$ is configured as a two-stage configuration can be considered. There are seven factors in two-levels (set A1 to G1) as examples of $L_8$ which is the source. These seven factors are laterally connected to each other, and when analyzing the first factor A1, the factors (A2 to A7) which correspond to A1 for the rest of the six factors in the orthogonal table are removed. Since the factor A1 and the factors removed in the first half are orthogonal to each other in the orthogonal table in the second half, only A1 to A7 are analyzed in the orthogonal table of the second half.

As described above, it can be determined that the number of appearances of the combination of the test matrix becomes of great importance to a test result analysis function. Accordingly, the iterative slide method which is performed by extending the HAYST method is superior to the pair-wise tests in terms of the test result analysis.

[4-2. Effect of Iterative Slide Method]

With the iterative slide method, it is possible to suppress, the weakness of the test by the HAYST method, "an increase in the number of test cases in a case of being a large number of small factors of the test target", that is, "a temporarily functional increase in test cases N with respect to the number of factors n" to an "increase in test cases at a rate of the number of factors $n^{1/2}$, that is, an increase in test cases at a rate of the number of factors to the half power (the order of the square root).

In addition, in the iterative slide method, compared with the HAYST method, the coverage ratio between two functions of 100% is not changed and the temporary functional increase in the number of test cases transitions to increase in test cases at a rate of the number of factors to the half power, the number of test cases is reduced. In addition, a technique according to the present embodiment, compared with the pair-wise test, in a case of the factors in two-levels or three-levels, the number of test cases acquired by the pair-wise test is lower, but in a case of the factors in equal to or greater than four-levels under the conditions of the approximate equation in FIG. 12 the number of test cases acquired by the technique according to the present embodiment is lower. Here, since the size of test cases of the iterative slide method is a power of 2, the size of the test matrix is not actually fixed.

FIG. 16 shows a result of performing allocation by using the tool of the iterative slide method and the tool of the PICT. By 289 factors in eight-levels, it can be confirmed that the number of test cases acquired by the iterative slide method is lower. There is no case created with more than 289 factors in sixteen-levels, but it can be considered that a value close to 2251 in FIG. 12 will actually be confirmed.

Next, the estimation equations for the number of test cases will be considered. When calculating the number of tests by using Equation (6) under the conditions in FIG. 14, the result is obtained as shown in FIG. 17.

In the column of the iterative slide method in FIG. 17, there is an item in which the number of test cases (the number of rows) is not a power of 2, this is because the same cases in the first row are removed when combining the cases in two stages. In addition, there is a large difference between the number of test cases in the table created by the iterative slide method and that in the estimation according to Equation (6) in some cases. That is because the size of the orthogonal table is only a power of 2 and thus the fixed size is not present in the orthogonal table (columns for allocating the factor remains). Here, when the value obtained from the estimation in Equation (6) is calculated by rounding up to a power of 2 which is larger than the value, the result shown in FIG. 18 is obtained.

In this manner, the characteristics of the number of test cases become apparent when using the iterative slide method and thus the estimation can be made. Accordingly, in the step of a test plan and a test requirement analysis, it is possible to tradeoff between the effect and efficiency when design is done by using the formulated number of test cases by the iterative slide method. That is, by referencing the following four steps, the number of test cases can be redesigned: (step 1): factors and levels to be combined are selected, (step 2): the number of test cases is calculated based on the estimation in Equation (6), (step 3): the number larger than the value obtained in (step 2) is rounded up to a power of 2, and (step 4): the value obtained in (step 3) is compared with the number which the is possible number of the test cases derived from the test numbers.

In addition, when the number of test cases obtained from the estimation equation is lower than the number of test cases which can be performed, it is possible to perform a more comprehensive test by adding the factors. In a case of the pair-wise test, the number of test cases is cleared after performing the allocation. In addition, there is no information regarding how many factors should be removed so as to acquire the desired number of test cases and thus trial and error is repeated.

The invention is not limited to the above-described embodiment. In addition, factors, corresponding to the number of levels of each column of a test matrix generated by the test design assistance device 10 mentioned above, and specific values of the levels may be allocated to each column, and test cases for the respective rows of the text matrix may be sequentially performed.

INDUSTRIAL APPLICABILITY

A test design assistance device, a test design assistance method, a program, and a computer-readable medium according to the invention are useful, for example, in verifying an operation of software.

The foregoing description of the exemplary embodiments of the present invent ion has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A test design assistance device comprising:
   an acquiring unit that acquires information about the number of levels indicating the number of values which can be obtained for each factor in a plurality of factors of a test target;
   a selection unit that selects a matrix capable of allocating all of factors in a maximum number of levels at least in the acquired information in the matrix capable of allocating the factors in multilevel generated based on an orthogonal table;
   a setting unit that sets the maximum number of levels in the number of levels of factors which are not allocated with respect to the selected matrix as a focused number of levels;
   an allocation unit that allocates factors in the focused number of levels to the matrix when the number of columns capable of allocating the factors in the focused number of levels is equal to or greater than the number of factors in the focused number of levels, in the selected matrix;
   an updating unit that updates the matrix by dividing a remaining column into columns capable of allocating the factors in the focused number of levels when there is the remaining column which is capable of allocating factors in the number of levels greater than the focused number of levels in the matrix, in a case where the number of columns capable of allocating the factors in the focused number of levels is not equal to or greater than the number of factors in the focused number of levels, in the selected matrix; and
   an execution unit that causes by the setting unit to execute processing after processing by the allocation unit or the updating unit and causes the setting unit, the allocation unit, and the updating unit to recursively execute the processing.

2. The test design assistance device according to claim 1, further comprising:
   an adding unit that adds levels such that the number of levels is set to a power of 2 pertaining to the factor which is not in the level of a power of 2 in the plurality of factors,
   wherein the acquiring unit acquires information indicating the number of values which can be acquired by each factor of the plurality of factors to which the number of levels is added by the adding unit.

3. The test design assistance device according to claim 2, further comprising:
   a size extension unit that extends the orthogonal table by laterally connecting orthogonal tables which only have the factors in the same level only by the number of columns thereof, vertically forming the laterally connected orthogonal tables into a two-stage configuration, and then changing the order of the columns of the orthogonal table on the lower stage; and
   a level number extension unit that extends a two-level orthogonal table to an orthogonal table including multilevel columns capable of allocating the factors in equal to or greater than four-levels which is a power of 2,
   wherein the selection unit selects the matrix capable of allocating all the factors in the maximum level number, at least in the acquired information, from the matrixes which are created by combining the orthogonal tables extended by the size extension unit in the orthogonal table of the number of levels, for each number of levels in the extended orthogonal table by the level number extension unit.

4. The test design assistance device according to claim 1, wherein the selection unit reselects a matrix which is larger than the selected matrix when there is not a remaining column which is capable of allocating factors in the number of levels greater than the focused number of levels in the matrix, in a case where the number of columns capable of allocating the factors in the focused number of levels is not equal to greater than the number of factors in the focused number of levels, in the selected matrix.

5. The test design assistance device according to claim 1, further comprising:
an output unit that outputs the matrix when all of factors in a minimum level number in the obtained information are allocated to the matrix by the allocation unit.

6. A test design assistance method causing a computer to execute a process comprising:
acquiring information about the number of levels indicating the number of values which can be obtained for each factor in a plurality of factors of a test target;
selecting a matrix capable of allocating all of factors in a maximum number of levels at least in the acquired information in the matrix capable of allocating the factors in multilevel generated based on an orthogonal table;
setting the maximum number of levels in the number of levels of factors which are not allocated with respect to the selected matrix as a focused number of levels;
allocating factors in the focused number of levels to the matrix when the number of columns capable of allocating the factors in the focused number of levels is equal to or greater than the number of factors in the focused number of levels, in the selected matrix;
updating the matrix by dividing a remaining column into columns capable of allocating the factors in the focused number of levels when there is the remaining column which is capable of allocating factors in the number of levels greater than the focused number of levels in the matrix, in a case where the number of columns capable of allocating the factors in the focused number of levels is not equal to or greater than the number of factors in the focused number of levels, in the selected matrix; and
executing the setting processing after the allocation processing or the updating processing and executing the setting processing, the allocation processing and the update processing recursively.

7. A non-transitory computer readable medium storing a program causing a computer to execute a process for test design assistance, the process comprising:
acquiring information about the number of levels indicating the number of values which can be obtained for each factor in a plurality of factors of a test target;
selecting a matrix capable of allocating all of factors in a maximum number of levels at least in the acquired information in the matrix capable of allocating the factors in multilevel generated based on an orthogonal table;
setting the maximum number of levels in the number of levels of factors which are not allocated with respect to the selected matrix as a focused number of levels;
allocating factors in the focused number of levels to the matrix when the number of columns capable of allocating the factors in the focused number of levels is equal to or greater than the number of factors in the focused number of levels, in the selected matrix;
updating the matrix by dividing a remaining column into columns capable of allocating the factors in the focused number of levels when there is the remaining column which is capable of allocating factors in the number of levels greater than the focused number of levels in the matrix, in a case where the number of columns capable of allocating the factors in the focused number of levels is not equal to or greater than the number of factors in the focused number of levels, in the selected matrix; and
executing the setting processing after the allocation processing or the updating processing and executing the setting processing, the allocation processing and the update processing recursively.

* * * * *